United States Patent
Hentz et al.

(10) Patent No.: US 10,552,680 B2
(45) Date of Patent: Feb. 4, 2020

(54) METHOD, APPARATUS AND COMPUTER PROGRAM PRODUCT FOR DISAMBIGUATION OF POINTS OF-INTEREST IN A FIELD OF VIEW

(71) Applicant: HERE Global B.V., Eindhoven (NL)

(72) Inventors: Augusto Henrique Hentz, Berlin (DE); Eduardo Vellasques, Berlin (DE); Tadej Štajner, Berlin (DE); Yuliia Kovalova, Berlin (DE)

(73) Assignee: HERE Global B.V., Eindhoven (NL)

( * ) Notice: Subject to any disclaimer, the term of this patent is extended or adjusted under 35 U.S.C. 154(b) by 88 days.

(21) Appl. No.: 15/671,324

(22) Filed: Aug. 8, 2017

(65) Prior Publication Data

US 2019/0050645 A1  Feb. 14, 2019

(51) Int. Cl.
- *G06K 9/00* (2006.01)
- *G06F 16/43* (2019.01)
- *G01C 21/34* (2006.01)
- *G10L 15/22* (2006.01)

(52) U.S. Cl.
CPC ..... *G06K 9/00671* (2013.01); *G01C 21/3476* (2013.01); *G06F 16/43* (2019.01); *G10L 15/22* (2013.01); *G10L 2015/223* (2013.01)

(58) Field of Classification Search
CPC ............ G06K 9/00671; G01C 21/3476; G06F 17/30023; G10L 2015/223; G10L 15/22
See application file for complete search history.

(56) References Cited

U.S. PATENT DOCUMENTS

| | | |
|---|---|---|
| 8,744,771 B2 | 6/2014 | Slusar |
| 9,043,140 B2 | 5/2015 | Slusar et al. |
| 2005/0165607 A1 | 7/2005 | Di Fabbrizio et al. |

(Continued)

FOREIGN PATENT DOCUMENTS

WO   WO 2009/087582 A1   7/2009

OTHER PUBLICATIONS

Hakkani-Tür, D. et al., *Eye gaze for spoken language understanding in multi-modal conversational interactions*, Proceedings of the 16th International Conference on Multimodal Interaction ACM (Nov. 2014) 4 pages.

(Continued)

*Primary Examiner* — Tom Y Lu
(74) *Attorney, Agent, or Firm* — Alston & Bird LLP

(57) ABSTRACT

A method, apparatus, and computer program product are therefore provided for disambiguating non-deterministic spoken dialog commands as they relate to points-of-interest and information regarding points-of-interest within or near the field of view of a user. An apparatus may include a processor and a memory including program code instructions. The program code instructions are configured to, when executed, cause the apparatus to at least: receive an indication of a user location; receive an indication of a field of view of the user at the location; receive a natural language utterance; generate, from the natural language utterance, a query, where the query includes at least one request determined from the natural language utterance, the location, and the field of view of the user; determine a point-of-interest associated with the query by conducting a search of a database using the generated query; and provide information associated with the point-of-interest via a user interface.

20 Claims, 6 Drawing Sheets

(56) References Cited

U.S. PATENT DOCUMENTS

| | | | |
|---|---|---|---|
| 2009/0030800 A1* | 1/2009 | Grois | G06F 17/30864 705/14.52 |
| 2009/0150156 A1 | 6/2009 | Kennewick et al. | |
| 2009/0316951 A1 | 12/2009 | Soderstrom | |
| 2011/0279446 A1 | 11/2011 | Castro et al. | |
| 2013/0030811 A1 | 1/2013 | Olleon et al. | |
| 2013/0288219 A1 | 10/2013 | Dheap et al. | |
| 2013/0290234 A1* | 10/2013 | Harris | G06N 5/022 706/46 |
| 2014/0005929 A1 | 1/2014 | Gale et al. | |
| 2014/0361973 A1 | 12/2014 | Raux et al. | |
| 2014/0365228 A1 | 12/2014 | Ng-Thow-Hing et al. | |
| 2015/0362988 A1 | 12/2015 | Yamamoto et al. | |
| 2016/0035348 A1 | 2/2016 | Kleindienst et al. | |
| 2016/0155445 A1 | 6/2016 | Selfridge et al. | |

OTHER PUBLICATIONS

Jaimes, A. et al., *Multimodal human-computer interaction: A survey*, Computer Vision and Image Understanding, vol. 108 (2007) 116-134.

Ji, Q. et al., *Real-Time Eye, Gaze, and Face Pose Tracking for Monitoring Driver Vigilance*, Real-Time Imaging, Elsevier Science Ltd. (2002) 357-377.

Kousidis, S. et al., *A Multimodal In-Car Dialogue System That Tracks The Driver's Attention*, Proceedings of the 16th International Conference on Multimodal Interaction (2014) 26-33.

Misu, T. et al., *Situated Language Understanding at 25 Miles per Hour*, Proceedings of the SIGDIAL 2014 Conference, Association for Computational Linguistics (Jun. 2014) 22-31.

Misu, Teruhisa, *Visual Saliency and Crowdsourcing-based Priors for an In-car Situated Dialog System*, Proceedings of the 2015 ACM on International Conference on Multimodal Interaction (2015) 75-82.

Smith, P. et al., *Determining driver visual attention with one camera*, IEEE Transactions on Intelligent Transportation Systems, vol. 4, No. 4, (Dec. 2003) 205-218.

Stiefelhagen et al., *Gaze tracking for multimodal human-computer interaction*, IEEE, International Conference on Acoustics, Speech, and Signal Processing, (1997) 2617-2620.

International Search Report and Written Opinion for PCT/EP2018/070520 dated Oct. 9, 2018, 10 pages.

\* cited by examiner

METHOD, APPARATUS AND COMPUTER PROGRAM PRODUCT FOR DISAMBIGUATION OF POINTS OF-INTEREST IN A FIELD OF VIEW

TECHNOLOGICAL FIELD

An example embodiment of the present invention relates generally to disambiguating non-deterministic spoken dialog commands, and more specifically, to disambiguating non-deterministic spoken dialog commands as they relate to points-of-interest within or near the field of view of a user.

BACKGROUND

Maps have been used for centuries for providing route geometry and geographical information, while routes have conventionally been planned by hand along paths defined by the maps. Conventional paper maps including static images of roadways and geographic features from a snapshot in history have given way to digital maps presented on computers and mobile devices, and navigation has been enhanced through the use of graphical user interfaces.

Digital maps and navigation can provide dynamic route guidance to users as they travel along a route. Further, dynamic map attributes such as route traffic, route conditions, and other dynamic map-related information may be provided to enhance the digital maps and facilitate navigation. Navigation systems that provide route guidance including dynamic route planning have conventionally established a route from an origin to a destination, and possibly a waypoint. Navigation systems and mapping services can provide spoken instructions and may be able to receive spoken instructions or requests, such as for establishing an origin and a destination. However, spoken language interfaces with navigation systems and map services providers are generally limited to route guidance related dialog.

BRIEF SUMMARY

A method, apparatus, and computer program product are therefore provided for disambiguating non-deterministic spoken dialog commands as they relate to points-of-interest and information regarding points-of-interest within or near the field of view of a user. According to an example embodiment, an apparatus is provided including at least one processor and at least one non-transitory memory including computer program code instructions. The computer program code instructions are configured to, when executed, cause the apparatus to at least: receive an indication of a user location; receive an indication of a field of view of the user at the location; receive a natural language utterance; generate, from the natural language utterance, a query, where the query includes at least one request determined from the natural language utterance, the location, and the field of view of the user; determine a point-of-interest associated with the query by conducting a search of a database using the generated query; and provide information associated with the point-of-interest via a user interface. The utterance may include a request for information about a point-of-interest including one or more of: hours of operation, a name of the point-of-interest, service provided at the point-of-interest, contact information for the point-of-interest, or user reviews of the point-of-interest.

According to some embodiments, the apparatus may optionally be caused to generate a natural language sentence including the information associated with the point-of-interest, where causing the apparatus to provide information associated with the point-of-interest via a user interface includes causing the apparatus to read aloud the natural language sentence. The apparatus may optionally be caused to establish a plurality of points-of-interest within the field of view of the user by causing the apparatus to: establish, from the user location, a circle sector of the field of view, and a radius of the field of view; and retrieve a plurality of points-of-interest having a location within the circle sector and radius of the user location. Causing the apparatus to establish a plurality of points-of-interest within the field of view may optionally include causing the apparatus to: retrieve a three-dimensional model of geometries of objects within the circle sector and radius of the user location; determine if each of the plurality of points-of-interest having a location within the circle sector and radius of the user location are visible to the user from the user location; and discard any points-of-interest determined to not be visible to the user.

The apparatus of some embodiments may optionally be caused to rank the plurality of points-of-interest not discarded by causing the apparatus to, for each non-discarded point-of-interest: determine a distance from the user location; determine a position of the point-of-interest within the field of view, where the position includes an angle relative to the center of the field of view; calculate a score for the point-of-interest based, at least in part, on the distance and the position; and rank each of the plurality of points-of-interest according to their respective scores. Causing the apparatus to determine a point-of-interest associated with the query by conducting a search of a database using the generated query may include causing the apparatus to: determine at least two points-of-interest associated with the query; determine at least one distinguishing feature that disambiguates the at least two points-of-interest; generate a natural language question based on the at least one distinguishing feature; and determine one of the at least two points-of-interest in response to a received reply to the natural language question. The at least one distinguishing feature may include one or more of: point-of-interest type, building feature, building construction material, position relative to a distinct location, building color, building size, business name, or business type. Causing the apparatus to determine a point-of-interest associated with the query may include filtering a plurality of points-of-interest according to a ranking of the points-of-interest based on a determined relevance to the query, where relevance is established based on a location relative to the user, a position within the field of view of the user, and a relevance of the point-of-interest to the at least one request for each respective point-of-interest.

Embodiments described herein may provide a computer program product including at least one non-transitory computer-readable storage medium having computer-executable program code instructions stored therein. The computer-executable program code instructions including program code instructions to: receive an indication of a user location; receive an indication of a field of view of the user at the location; receive a natural language utterance; generate, from the natural language utterance, a query, where the query includes at least one request determined from the natural language utterance, the location, and the field of view of the user; determine a point-of-interest associated with the query by conducting a search of a database using the generated query; and provide information associated with the point-of-interest via the user interface. The utterance may include a request for information about a pointof-interest including one or more of: hours of operation, a name of the point-of-interest, services provided at the point-of-interest, contact information for the point-of-interest, or user reviews of the point-of-interest.

According to some embodiments, the computer program product may further include program code instructions to: generate a natural language sentence including the information associated with the point-of-interest, where the program code instructions to provide information associated with the point-of-interest via a user interface includes program code instructions to read aloud the natural language sentence. The computer program product may optionally include program code instructions to establish a plurality of points-of-interest within the field of view of the user using program code instructions to: establish, from the user location, a circle sector of the field of view, and a radius of the field of view; and retrieve a plurality of points-of-interest having a location within the circle sector and radius of the user location.

The program code instructions to establish a plurality of points-of-interest within the field of view may further include program code instructions to: retrieve a three-dimensional model of geometries of objects within the circle sector and radius of the user location; determine if each of the plurality of points-of-interest having a location within the circle sector and radius of the user location are visible to the user from the user location; and discard any points-of-interest determined to not be visible to the user. Embodiments may optionally include program code instructions to rank the plurality of points-of-interest not discarded using program code instructions to, for each non-discarded point-of-interest: determine a distance from a user location; determine a position of the point-of-interest within the field of view, where the position includes an angle relative to a center of the field of view; calculate a score for the point-of-interest based, at least in part, on the distance and the position; and rank each of the plurality of points-of-interest according to their respective scores. The program code instructions to determine a point-of-interested associated with the query by conducting a search of a database using the generated query may include program code instructions to: determine at least two points-of-interest associated with the query; determine at least one distinguishing feature that disambiguates the at least two points-of-interest; generate a natural language question based on the at least one distinguishing feature; and determine one of the at least two points-of-interest in response to a received reply to the natural language question.

According to some embodiments, the at least one distinguishing feature may include one or more of: point-of-interest type, building feature, building construction, building material, position relative to a distinct location, building color, building size, business name, or business type. The program code instructions to determine a point-of-interest associated with the query may include program code instructions to filter a plurality of points-of-interest according to a ranking of the points-of-interest based on a determined relevance to the query, where the relevance is established based on a location relative to the user, a position within the field of view of the user, and a relevance of the point-of-interest to the at least one request for each respective point-of-interest.

Embodiments described herein may provide a mapping system including a memory configured to store map data and point-of-interest information associated a plurality of points-of-interest, and processing circuitry. The processing circuitry may be configured to: receive an indication of a user location; receive an indication of a field of view of the user at the location; receive a natural language utterance; generate, from the natural language utterance, a query, where the query includes at least one request determined from the natural language utterance, the location, and the field of view of the user; determine a point-of-interest associated with the query by conducting a search of the memory using the generated query; and provide information associated with the point-of-interest via the user interface. The processing circuitry configured to determine a point-of-interest associated with the query may include processing circuitry configured to filter a plurality of points-of-interest according to a ranking of the points-of-interest based on a determined relevance to the query, where relevance is established based on a location relative to the user, a position within the field of view of the user, and a relevance of the point-of-interest to the at least one request for each respective point-of-interest.

BRIEF DESCRIPTION OF THE DRAWINGS

Figure 1:
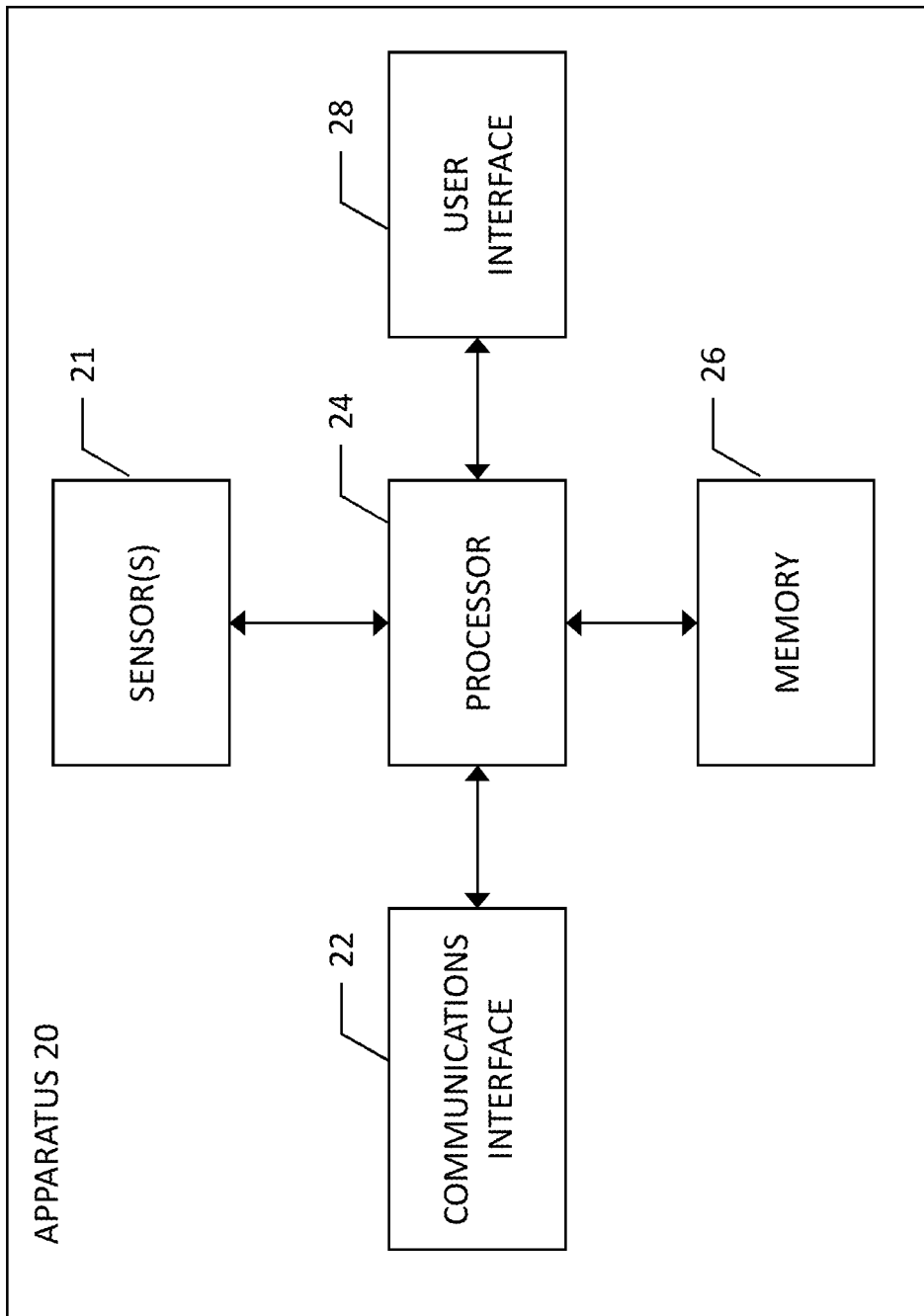
Figure 2:
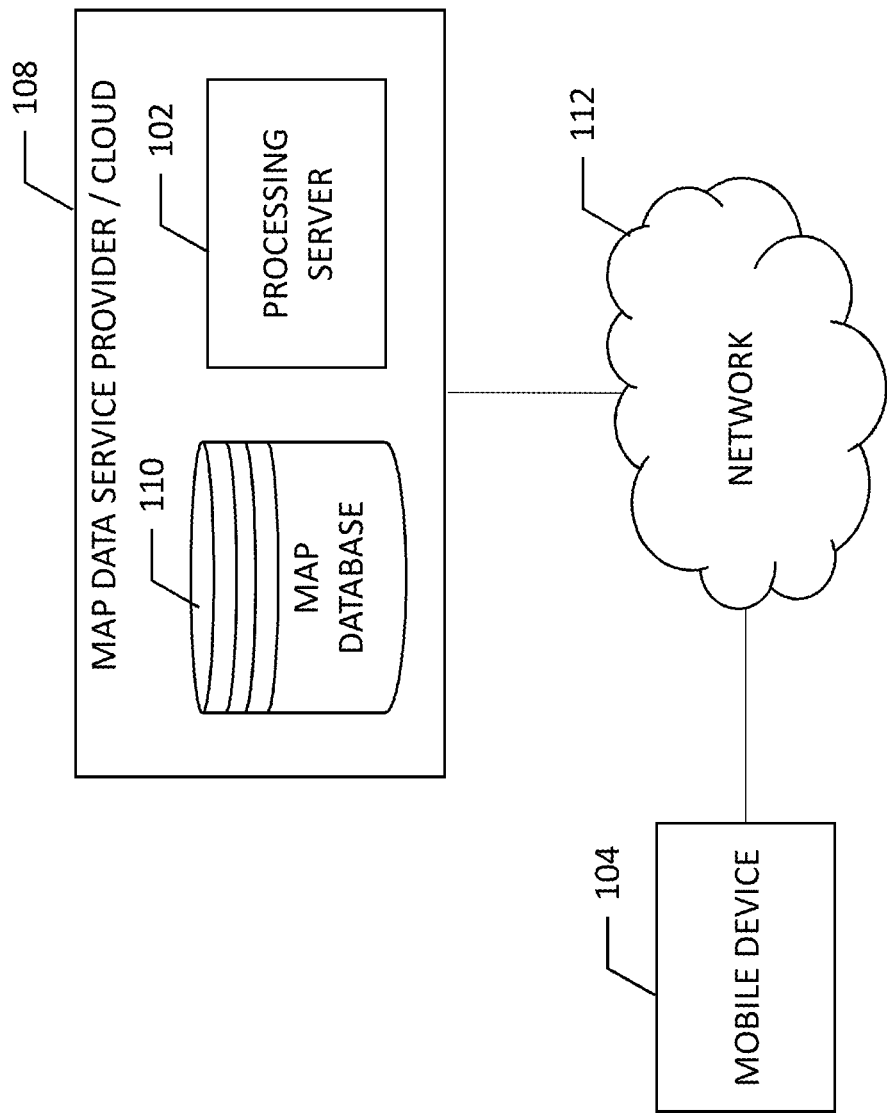
Figure 3:
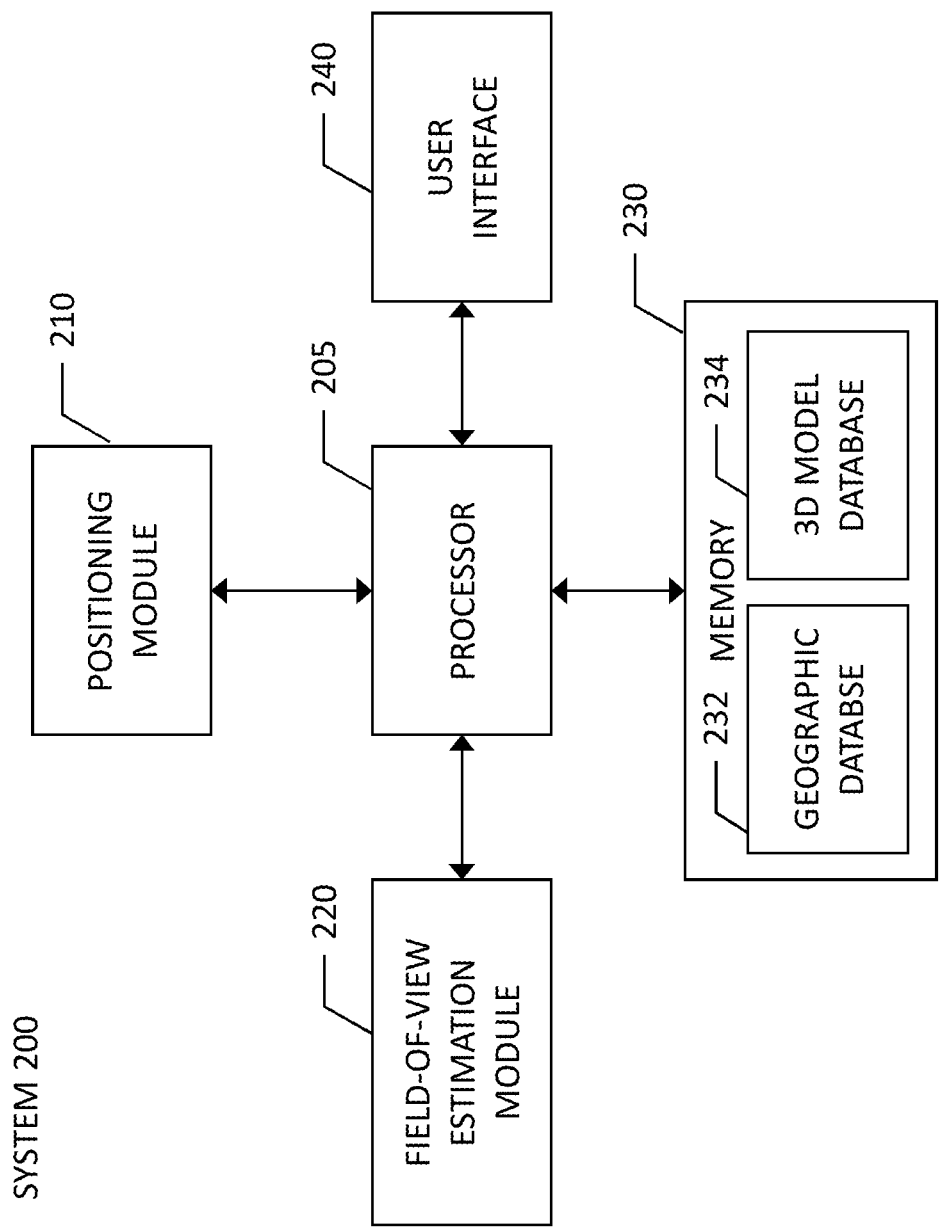
Figure 4:
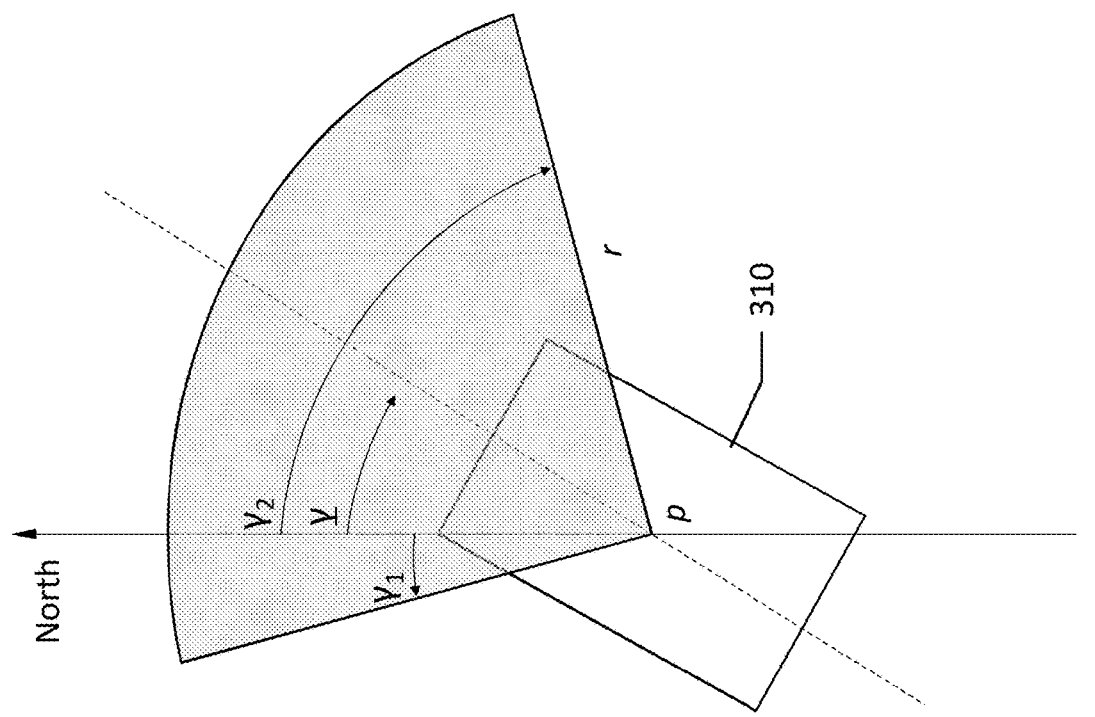
Figure 5:
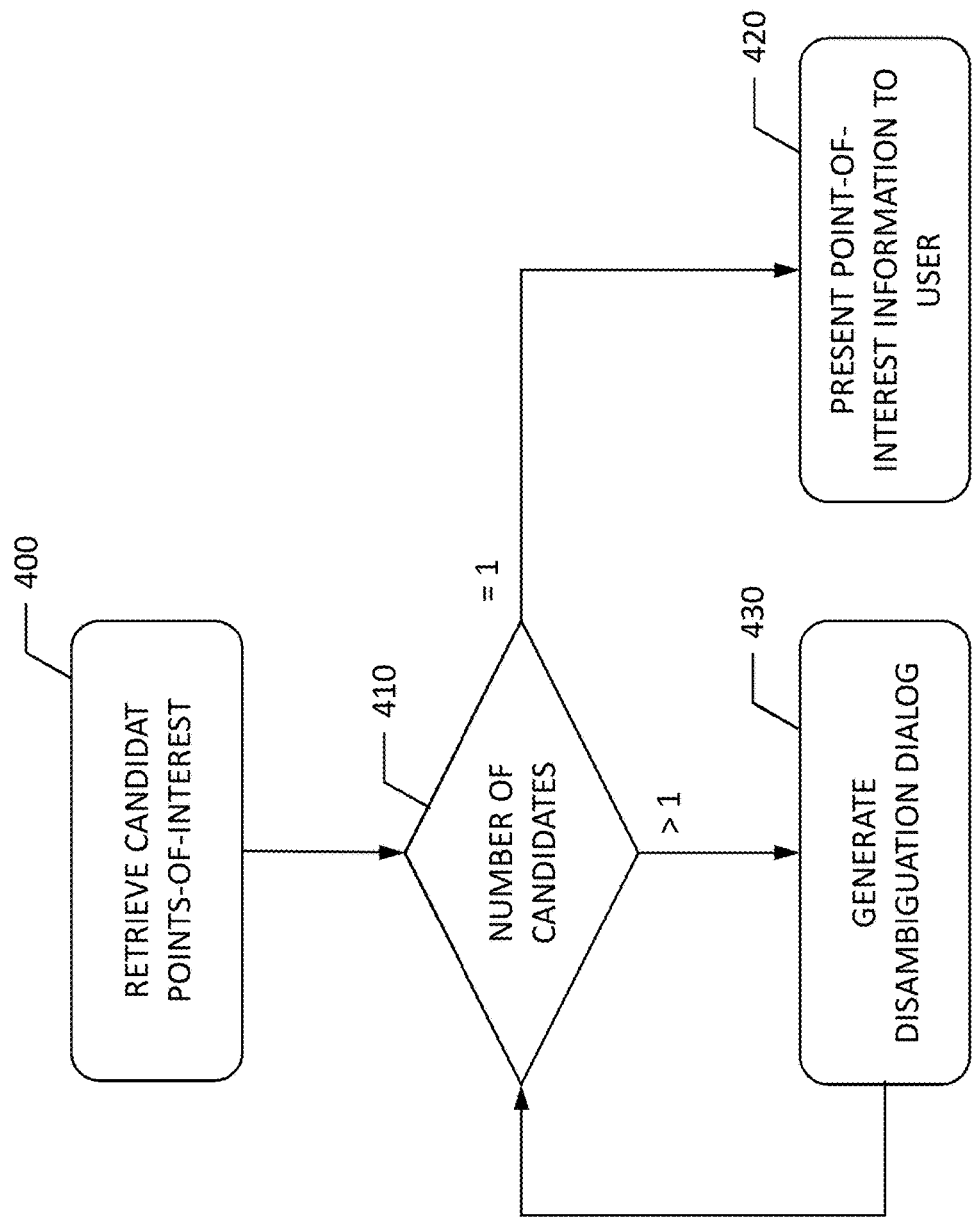
Figure 6:
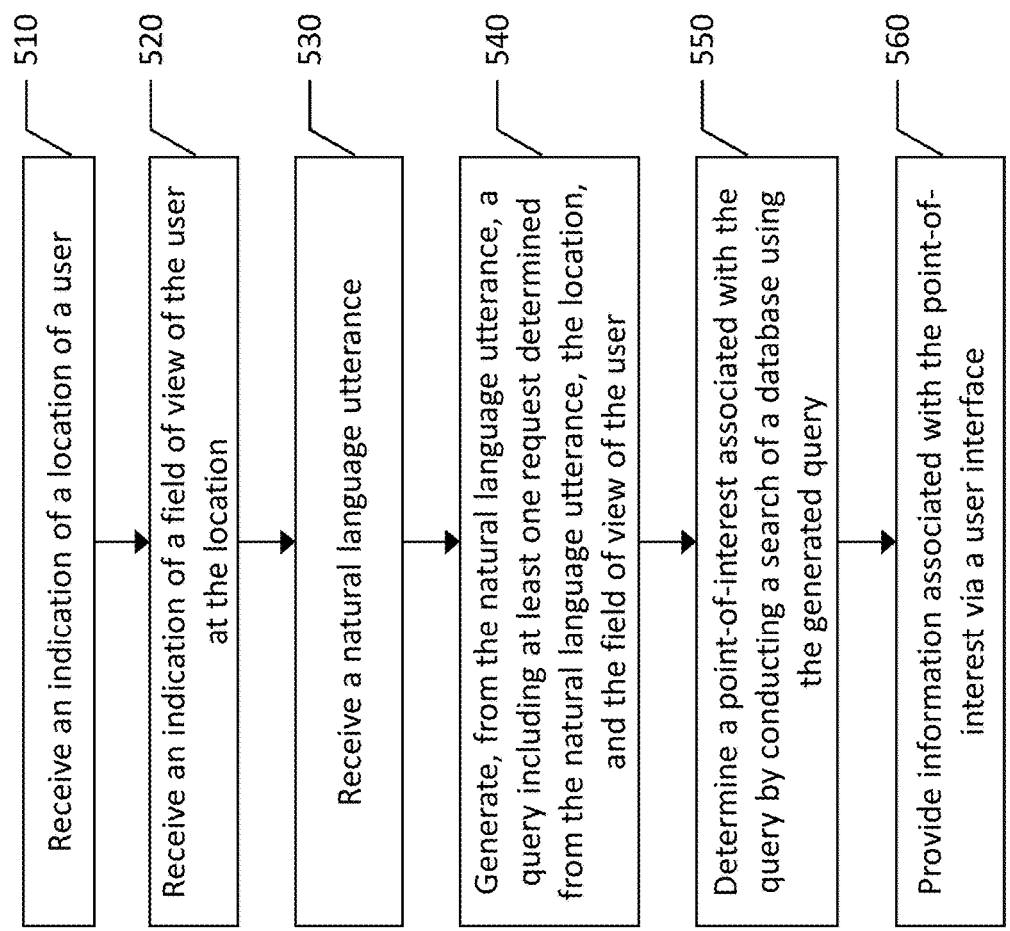

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present invention;

FIG. 2 is a block diagram of a system of implementing spoken dialog for use in disambiguating points-of-interest within a user's field of view according to an example embodiment of the present invention;

FIG. 3 is another block diagram of a system of implementing spoken dialog for use in disambiguating points-of-interest within a user's field of view according to an example embodiment of the present invention;

FIG. 4 illustrates a field of view estimation according to an example embodiment of the present invention;

FIG. 5 is a flowchart of a method for disambiguating points-of-interest within a user's field of view according to an example embodiment of the present invention; and FIG. 6 is a flowchart illustrating a method of spoken dialog for disambiguating points-of-interest within a user's field of view according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for disambiguating non-deterministic spoken dialog commands as they relate to points-of-interest within or near the field of view of a user. Embodiments described herein improve the way in which the user of a spoken dialog system in a vehicle can refer to points-of-interest and allow users to refer to points-of-interest in their field of view by using vague terms, also referred to as non-deterministic terms, such as "that building", "there", "over there", "that restaurant", etc. Embodiments may accomplish this by first estimating a user's field of view using on-board sensors, then querying a geographic database, such as from a map services provider, to retrieve point-of-interest information in the region determined to be in the user's field of view. The spoken dialog system of example embodiments may optionally ask disambiguating questions to narrow down the specific point-of-interest that a user is referring to. Such follow-up questions may be carefully chosen to maximize the chance that the driver's answer will remove any ambiguity. For example, the chosen question may focus on a feature that is distinct between the candidate points-of-interest established from the user's request.

As described herein, embodiments of the claims may combine a spoken dialog system with a field of view estimation together with three-dimensional models of the real world to allow users to get meaningful answers to questions involving spatial references, such as "what is over there?" or "at what time does that shop open?". While embodiments described herein are generally described within the use context of in a vehicle, such as a car, embodiments may optionally be implemented in any type of vehicle or using a user-worn device in order to estimate or establish a field of view of a user. In the context of a vehicle, the vehicle may include on-board sensors or user device sensors to establish the vehicle position and orientation in the real world. A vehicle sensor may be able to understand orientation based on a direction that a vehicle is facing, while a user device may establish orientation based on movement, for example. A user-worn device may understand orientation based on a vector established from the orientation of the sensor, such as along the arm of a pair of glasses worn by a user that include at least a portion of the apparatus described herein. From the orientation, a user's field of view may be estimated. These pieces of information may be combined with a three-dimensional model of the real world to estimate what places and objects are visible to the user at a given time. This information may be fed as context to a spoken dialog system, allowing it to determine the actual location a user is referring to when using vague terms such as "that building," or "over there".

Embodiments described herein include a disambiguation dialog policy based on the probability model of the visible scene of points-of-interest and a background knowledge database. Described herein is an algorithm that selects a disambiguation question whose answer is expected to be the most informative and to narrow the candidate points-of-interest to a single point-of-interest. The problem is framed as finding a set of attributes where picking one of the attributes that would be most likely to disambiguate the scene and result in the user selecting the intended point-of-interest.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing a navigation system user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms, such as receiving spoken dialog or reading spoken dialog to a user. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

The apparatus 20 may support a mapping application so as to present maps or otherwise provide navigation assistance. In order to support a mapping application, the computing device may include or otherwise be in communication with a geographic database, such as may be stored in memory 26. For example, the geographic database includes node data records, road segment or link data records, point-of-interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a navigation system user interface may be provided to provide route guidance from an origin, along a route to a plurality of destinations or points-of-interest. Navigation systems may receive an indication of an origin, which may include a current location of a device on which the navigation system is operating (e.g., an in-vehicle navigation system or a mobile device, for example) or a separate location specified by the user, and an indication of a category of point-of-interest that the user is interested in proximate the location specified. In response to receiving the location and the point-of-interest category, a plurality of points-of-interest may be identified. Routes from the location to each of the plurality of points-of-interest may be calculated based upon available roadways, walkways, etc. These routes may be used, in an algorithm, for example, to generate one or more consolidated routes that encounter two or more of the points-of-interest. Said differently, two or more of the points-of-interest may be found along a consolidated route. The navigation system user interface may optionally include a speaker and microphone used to both provide spoken dialog instructions or information and to receive spoken dialog from a user.

A map service provider database may be used to provide route guidance to a navigation system and may be used to consolidate routes to different points-of-interest. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point-of-interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as points-of-interest.

The map database may include a database of points-of-interest and information associated with each point-of-interest. Information associated with each point-of-interest may include one or more categories for the point-of-interest, such as fueling stations, hotels, restaurants, museums, stadiums, offices, auto repair shops, buildings, stores, parks, etc. Information regarding each point-of-interest may further include sub-categories, such as restaurant type (e.g., pizza, Asian fusion, Italian, etc.). The database may also include or have access to attributes for various points-of-interest, such as a database of user-reviews, price point of services/products provided, hours of operation, popularity, etc. The map database 110 can include data about the POIs and their respective locations in the point-of-interest records. The map database 110 may include data about places, such as cities, towns, or other communities, and other geographic features such as bodies of water, mountain ranges, etc. Such place or feature data can be part of the point-of-interest data or can be associated with points-of-interest or point-of-interest data records (such as a data point used for displaying or representing a position of a city). In addition, the map database 110 can include event data (e.g., traffic incidents, construction activities, scheduled events, unscheduled events, etc.) associated with the point-of-interest data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. These map geometries may optionally include three-dimensional map information that provides building footprint information, building profile/facade information, point-of-interest shape and size, etc. This three-dimensional information may be used to generate real-world representations of points-of-interest in a mapped environment.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an in-vehicle navigation system, such as in a vehicle's head unit, infotainment unit, or an ADAS (advanced driver assistance system), a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of one or more personalized routes or route segments based on one or more calculated and recorded routes, according to some example embodiments.

Example embodiments provided herein provide a method of disambiguating non-deterministic spoken dialog commands as they relate to points-of-interest within or near the field of view of a user. The method employs a spoken dialog system combined with field of view estimation and three-dimensional models of the real world that allow a user to get meaningful answers to questions involving spatial references, such as "what is over there?" or "at what time does that shop open?".

In practice, when a user is moving through a region that includes a plurality of points-of-interest, the user may be interested in learning more about a specific one or ones of the points-of-interest. Embodiments described herein allow a user to verbally request such information about a point-of-interest, while the system of example embodiments establishes a field of view, the points-of-interest visible in the field of view, and which point(s) of interest relate to the request of a user. If more than one point-of-interest is relevant to the user's information request, the system of example embodiments may provide a question to the user, such as a spoken question or a question presented on a display, where an answer to the question will disambiguate the plurality of relevant results to establish which point-of-interest the user is requesting more information about.

One challenge solved by example embodiments described herein is to determine which real-world points-of-interest, places, or objects a user is referring to when addressing the system with vague terms such as "that", "over there", or "that restaurant". This is accomplished by estimating the user's field of view, plus an understanding of the real world in the form of a geographic database and three-dimensional models of the buildings in the field of view of the user. As noted above, any remaining ambiguities may be solved by carefully chosen follow-up questions to the user.

According to an example embodiment as illustrated in FIG. 3, a system 200 for implementing methods described herein may include a positioning module 210, which may include sensors, such as sensor(s) 21 of FIG. 1. The positioning module may include global positioning system (GPS) sensors, sensors to determine cellular signal triangulation, directional sensors such as a compass, or the like. The positioning module may also include sensors that establish the orientation of a user or a vehicle in which the user is located. For example, an accelerometer, gyroscope, or speed sensor may establish a direction of movement, which may establish the orientation of a user presuming that the direction of movement is also the direction in which a user's gaze is focused. If a system includes a vehicle, the vehicle may provide an indication of heading or orientation through the direction in which the vehicle is pointing. These sensors may provide the system with a position/location and orientation of a user. The positioning module 210 may include processing capacity to translate any received signals to identify the position or location and the orientation of a user or a vehicle; however, in some embodiments, a processor 205 may be separately used to interpret the signals received at the positioning module 210 to establish position and orientation.

While the positioning module 210 may be used to presume a user's gaze, embodiments may optionally include a field-of-view estimation module 220 that is specifically configured to establish the most likely field-of-view of a user of the system 200. The field-of-view estimation module 220 may be configured with any of a variety of sensors used to establish a user's field-of-view, such as one or more gaze-tracking sensors or a scene saliency estimator. The gaze tracking sensors may be mounted in a user's vehicle and may optionally be used in conjunction with driver alertness detection in order to multiplex sensor use, though gaze tracking sensors may optionally be user-worn devices, such as glasses, or sensors from a device such as a mobile terminal that is removable from a vehicle, such as a cellular telephone. Embodiments may utilize the forward-facing camera of a cellular phone or smart phone that is mounted in a position in a vehicle that provides navigation assistance such that systems of example embodiments may be self-contained in a mobile device and easily transportable.

The system 200 of example embodiments may also include a geographic database 232 in a memory 230 of landmarks and points-of-interest. This database may provide an index of landmarks and points-of-interest by their geographic location, and may associate these locations with metadata, such as user ratings, opening times, textual descriptions, physical characteristics, contact information, etc. The memory 230 may also include a three-dimensional model database of the real world. This database can be a detailed model of all buildings and objects or a simplified model where buildings are represented as boxes encoding their footprint and height. Thus, the three-dimensional model database may include wire mesh type models to reduce the size of the database, or may include detailed renderings of objects and points-of-interest based upon memory available, bandwidth, and processing capabilities, for example.

The system 200 of embodiments may also include a user interface which may enable the spoken dialog communication between the system 200 and a user. The user interface may include a spoken language understanding module (e.g., a natural language understanding module) to convert the user's speech to text, determine context, and to determine the intent of the user's speech. A dialog manager module may optionally be included to generate structured answers to the user's queries or requests. For example, a dialog manager module may be configured to use one or more knowledge sources such as the geographic database 232, the three-dimensional model database 234, databases containing information about points-of-interest, and/or the Internet to source data for generation of data which may be used to respond to a user's request. The dialog manager module may implement a disambiguation policy approach for generating questions with the highest likelihood of removing ambiguity when forming a response to a user's query or request, as detailed further below. A natural language generation module may be included to convert the data and information of the dialog manager into natural language sentences. While the dialog manager may establish answers to the user's query, the answers may not be in a form that is well understood to a user or pleasing to a user, such that the natural language generation module may provide a more pleasing user interface. A text-to-speech module of the user interface 240 may finally convert the natural language sentences into spoken dialog for the user to hear. Optionally or additionally, the natural language generated may be presented on a user interface to be read instead of or in addition to the spoken language dialog.

An example embodiment of a user interaction with the system will herein be described. A user may be in a vehicle driving through a city. While the vehicle is stopped, a user may see a point-of-interest for which they want more information and request that information from the system. A user may speak a question such as "At what time does that restaurant open?" The spoken language understanding module of the user interface 240 may extract the user intent in a structured form. The extracted information may include: operating hours (to be determined by the system); point-of-interest name (to be determined by the system); point-of-interest type (established as restaurant); and location (within the user's field of view). The system 200 may estimate the user's field of view as described in greater detail below using module 220. The system 200 may then query the geographic database 232 for points-of-interest within the user's field of view, as further described below. The points-of-interest within the user's field of view may be filtered using the criteria established by the spoken language understanding module. This can involve multiple voice interactions between the user and the system based on the ambiguity of the user's request. In this example, the spoken language understanding module detects that the user wants information about a restaurant, so it does not consider all points-of-interest that are not restaurants. For ease of understanding in this example, we assume that there is only one restaurant in the user's established field of view.

After filtering, the system 200 selects a single point-of-interest, which in this case is the lone restaurant within the field of view. The requested information (name and operating hours in this example) is retrieved either by meta-information available in the geographic database itself, or other knowledge source. In this example, the structured answer is: inform(POI name="Bob's Burgers", operating hours=[Monday to Sunday, 11:00 am to 10:00 pm]). The spoken dialog system generates a natural language sentence encoding this structured information. In this example, the system's spoken dialog may be "Bob's Burgers is open daily from 11 am to 10 pm." Finally, the sentence is presented by to the user by the text-to-speech system.

In order to retrieve points-of-interest within the user's field of view, the field of view must be established. FIG. 4 illustrates an example embodiment of the determination of a field of view of a user. As shown, let p be the coordinates of the user's current location in a vehicle 310 as established through positioning module 210. The angles $\gamma_1$ and $\gamma_2$ determine the user's estimated field of view, and a search radius r is established as the distance from the user that the user can see. From the geographic database 232, candidate points-of-interest are retrieved that lie within a circle sector determined by p, r, $\gamma_1$ and $\gamma_2$. From the three-dimensional model database 234, the geometries of all buildings, objects, and points-of-interest that lie within the circle sector defined by p, r, $\gamma_1$ and $\gamma_2$ are retrieved. The retrieved candidate points-of-interest may be sorted by descending distance to the user's current location (furthest objects first). For every point-of-interest $POI_i$, the system 200 may establish if the point-of-interest is visible to the user based on the three-dimensional model database, or if the point-of-interest is obstructed from view. If the point-of-interest is not visible, it is discarded and is no longer a candidate. The remaining candidate points-of-interest are then returned as potential results to the user's query.

In order to establish if a point-of-interest is visible to a user, an algorithm may be implemented. If the point-of-interest is a full building (for example, a shopping mall, an apartment building, a street address, or a landmark), the algorithm may return whether the building is visible using the three-dimensional model geometry. If the point-of-interest is part of a building (for example, a store within a shopping mall or a retail store on the ground floor of a building), the system may first establish if the building is visible to the user using the three-dimensional model database 234. If the building is not visible, it is discarded, but if the building is visible, it is established if the point-of-interest is on the street level, facing the street. If so, the point-of-interest is a candidate, while if false, the point-of-interest is not a candidate and is discarded. Further, through use of a three-dimensional model database 234, a position, and an orientation, it can be established if there are obstructions or obstacles in the user's field of view that may preclude them from seeing certain points-of-interest. This may allow embodiments described herein to further limit point-of-interest candidates that may be obstructed from view.

Once established if points-of-interest from among a plurality of candidate points-of-interest are visible, those visible remain candidates while those not visible are discarded. The points-of-interest may then be ranked according to a calculated probability that the point-of-interest is the subject of a user's query or request. Given the set of retrieved points-of-interest Π and two random variables D and Θ representing their distance and angles relative to the position p, the probability of a given point-of-interest $POI\pi_i$ can be estimated conditioned on its distance $d(\pi_i)$ and angle $\theta(\pi_i)$ as:

$$P(\prod | \Theta, D) = \frac{P(\prod | D) P(\prod | \Theta)}{P(\prod)}$$

Assuming conditional independence between D and Θ, and where:

$$P(\prod | D) = \alpha \frac{d_{max} - d(\pi_i)}{d_{max} - d_{min}}$$

Is an estimate of the probability of a point-of-interest POI π conditioned on its distance d from the vehicle, $d_{max}$ is the distance of the furthest point-of-interest, $d_{min}$ is the distance to the nearest point-of-interest, and α is a scaling factor to ensure the probability distribution sums to one. P(Π|Θ) is the probability of a POI π conditioned on its angle θ from the center of the field of view. This is estimated by either a gaze-tracking system, or by the saliency map of the scene. P(Π) is the prior probability of a given POI π. This can be estimated by popularity, frequency of queries, relative ranking or, lacking any additional information, considered a uniform distribution among the N POIs in the field of view.

Finally, the probabilities are normalized by:

$$P(\pi_i | \theta(\pi_i), d(\pi_i)) = \frac{P(\pi_i | \theta(\pi_i), d(\pi_i))}{\sum_{\pi \in \Pi} P(\pi | \theta(\pi), d(\pi))}$$

The system may then rank the candidate points-of-interest according to their probabilities. All of the points-of-interest whose probability is greater than an empirically determined threshold may be considered candidates to be presented to the user. If more than one candidate remains, the system may then generate disambiguating dialog to further narrow the points-of-interest down to a single point-of-interest.

Depending upon the density of points-of-interest and the ambiguity of the query or request from a user, it is possible that the system finds multiple points-of-interest in the user's field of view. However, to present spoken information to the user, only a small subset of the visible points-of-interest should be selected. As such, the spoken dialog system of example embodiments may request information from the user for disambiguating information as shown in the flowchart of FIG. 5.

As shown in FIG. 5, the candidate points-of-interest are retrieved at 400. At 410, it is determined how many candidate points-of-interest exist. If there is only one, the point-of-interest information is presented to the user at 420. If there is more than one candidate point-of-interest, disambiguation dialog is generated at 430 to narrow down the number of candidates until only a single point-of-interest candidate remains, whereupon the point-of-interest information is presented to the user at 420.

An example embodiment of the disambiguation dialog generation is presented herein, where $\pi_i \in \Pi$ is a point-of-interest and $a_{ij} \in A$ is a binary attribute representing that the point-of-interest has the attribute j. A situated dialog state tracker may return a probability distribution $P(\Pi)$ over the points-of-interest, as described above. The goal is to respond with a follow-up question phrased in a way that would maximize the chance of its answer resolving the question and removing the ambiguity. For instance, if all of the points-of-interest are buildings with different colors, a productive follow-up question would be "Do you mean the red or the green building?" or "what color is the building", where the colors, including red and green, are the informative attributes j selected for the disambiguation.

The disambiguation of points-of-interest may be performed in a number of ways, such as a set of rules for informative attribute selection or learning an end-to-end deep learning model that predicts the informative attributes given the query and the situation. One such embodiment using information theory concepts is described herein, where $\Pi$ and A are treated as random variables. $P(\Pi)$ is the probability on the points-of-interest provided by the situated dialog tracker. $P(\Pi|A=a_k)$ is the probability distribution over points-of-interest when an attribute is specified. Given that, the most informative attribute may be selected by observing the information gain criterion:

$$IG(\Pi, A=a_k) = H(\Pi) - H(\Pi|A=a_k)$$

Where H( ) is the entropy function. This is similar to the heuristics used in building decision tree models, where the attributes whose information gain is the highest are picked as decision points. Described herein is a special case of learning a decision tree with depth one. To complete this model, a conditional probability distribution must be defined between two places and their attributes which can be obtained empirically from a spatial dataset of points-of-interest.

Since map data may be outdated or incorrect, a confusion factor among attributes may be included when estimating $P(\Pi|A)$. For instance, even though the colors of the buildings may not match the perceived colors, a meaningful question could still be produced from the distinctions. The information gain can be generalized as a Kullback-Leibler divergence, which can also be used as a distance metric such that another embodiment can be solved from a geometric problem. In such an embodiment, a vector space of points-of-interest defined by their attributes can be used and the attribute that produces the greatest separation between the points-of-interest can be used to best represent the distinctions between the points-of-interest. In this model, the weights of the attributes given the point-of-interest data set are estimated. The attributes or distinguishing features of a point-of-interest may include a point-of-interest type (e.g., restaurant, park, monument, etc.), a building or environment feature (e.g., awning, columns, hedges, trees, signs, displays, etc.), building construction (e.g., single-story, multi-story, etc.), building material (e.g., brick, siding, stone, etc.), building color, building size, business name, or business type, for example.

Embodiments described herein allow users to obtain meaningful answers to questions about the real world environment around them. According to example embodiments, the user does not need to know names or addresses of points-of-interest in order to find out more information about them, allowing for a more spontaneous, natural interaction. When used by a driver of a vehicle, reducing driver frustration when interacting with the system provides a safety benefit and enables a user to safely operate a vehicle while interacting with the system through spoken dialog.

FIG. 6 is a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 6 illustrates a method for providing a user interface for providing information to a user about a point-of-interest in response to a natural language utterance, and disambiguating the point-of-interest from non-deterministic spoken dialog queries or requests. As shown at 510, an indication of a location of a user is received. The location may be established by a locationing method, such as global positioning system sensors. An indication of a field of view of the user at the location may be received at 520, where the field of view may be established based, at least in part, on a heading or orientation of the user. A natural language utterance may be received at 530, where the natural language utterance is received and interpreted by a natural language understanding module of the system. From the natural language utterance, a query is generated including at least one request determined from the natural language utterance, the location, and the field of view of the user as shown at 540. At 550, a point-of-interest associated with the query is determined by conducting a search of a database using the generated query. At 560, the information associated with the point-of-interest is provided to a user via the user interface.

In an example embodiment, an apparatus for performing the method of FIG. 6 above may comprise a processor (e.g., the processor 24) configured to perform some or each of the operations (510-560) described above. The processor may, for example, be configured to perform the operations (510-560) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-560 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:

receive an indication of a user location;
receive an indication of a field of view of the user at the location, wherein the field of view of the user is established, at least in part, by a gaze tracking sensor;
receive a natural language utterance;
generate, from the natural language utterance, a query, wherein the query includes at least one request determined from the natural language utterance, the location, and the field of view of the user;
determine a point-of-interest associated with the query by conducting a search of a database using the generated query; and
provide information associated with the point-of-interest via a user interface.

2. The apparatus of claim 1, wherein the utterance comprises a request for information about a point-of-interest including one or more of: hours of operation, a name of the point-of-interest, services provided at the point-of-interest, contact information for the point-of-interest, or user reviews of the point-of-interest.

3. The apparatus of claim 1, wherein the apparatus is further caused to:

generate a natural language sentence comprising the information associated with the point-of-interest, wherein causing the apparatus to provide information associated with the point-of-interest via a user interface comprises causing the apparatus to read aloud the natural language sentence.

4. The apparatus of claim 1, wherein the apparatus is further caused to establish a plurality of points-of-interest within the field of view of the user by causing the apparatus to:

establish, from the user location, a circle sector of the field of view, and a radius of the field of view; and
retrieve a plurality of points-of-interest having a location within the circle sector and radius of the user location.

5. The apparatus of claim 4, wherein causing the apparatus to establish a plurality of points-of-interest within the field of view further comprises causing the apparatus to:

retrieve a three-dimensional model of geometries of objects within the circle sector and radius of the user location;
determine if each of the plurality of points-of-interest having a location within the circle sector and radius of the user location are visible to the user from the user location; and
discard any points-of-interest determined to not be visible to the user.

6. The apparatus of claim 5, wherein the apparatus is further caused to rank the plurality of points-of-interest not discarded by causing the apparatus to, for each non-discarded point-of-interest:

determine a distance from the user location;
determine a position of the point-of-interest within the field of view, wherein the position comprises an angle relative to a center of the field of view;
calculate a score for the point-of-interest based, at least in part, on the distance and the position; and
rank each of the plurality of points-of-interest according to their respective scores.

7. The apparatus of claim 1, wherein causing the apparatus to determine a point-of-interest associated with the query by conducting a search of a database using the generated query comprises causing the apparatus to:

determine at least two points-of-interest associated with the query;
determine at least one distinguishing feature that disambiguates the at least two points-of-interest;

generate a natural language question based on the at least one distinguishing feature; and determine one of the at least two points-of-interest in response to a received reply to the natural language question.

8. The apparatus of claim 7, wherein the at least one distinguishing feature comprises one or more of: point-of-interest type, building feature, building construction, building material, position relative to a distinct location, building color, building size, business name, or business type.

9. The apparatus of claim 1, wherein causing the apparatus to determine a point-of-interest associated with the query comprises filtering a plurality of points-of-interest according to a ranking of the points-of-interest based on a determined relevance to the query, wherein relevance is established based on a location relative to the user, a position within the field of view of the user, and a relevance of the point-of-interest to the at least one request for each respective point-of-interest.

10. A computer program product comprising at least one non-transitory computer-readable storage medium having computer-executable program code instructions stored therein, the computer-executable program code instructions comprising program code instructions to:

receive an indication of a user location;

receive an indication of a field of view of the user at the location, wherein the field of view of the user is established, at least in part, by a gaze tracking sensor;

receive a natural language utterance;

generate, from the natural language utterance, a query, wherein the query includes at least one request determined from the natural language utterance, the location, and the field of view of the user;

determine a point-of-interest associated with the query by conducting a search of a database using the generated query; and provide information associated with the point-of-interest via a user interface.

11. The computer program product of claim 10, wherein the utterance comprises a request for information about a point-of-interest including one or more of: hours of operation, a name of the point-of-interest, services provided at the point-of-interest, contact information for the point-of-interest, or user reviews of the point-of-interest.

12. The computer program product of claim 10, further comprising program code instructions to:

generate a natural language sentence comprising the information associated with the point-of-interest, wherein the program code instructions to provide information associated with the point-of-interest via a user interface comprises program code instructions to read aloud the natural language sentence.

13. The computer program product of claim 10, further comprising program code instructions to establish a plurality of points-of-interest within the field of view of the user using program code instructions to:

establish, from the user location, a circle sector of the field of view, and a radius of the field of view; and retrieve a plurality of points-of-interest having a location within the circle sector and radius of the user location.

14. The computer program product of claim 13, wherein the program code instructions to establish a plurality of points-of-interest within the field of view further comprises program code instructions to:

retrieve a three-dimensional model of geometries of objects within the circle sector and radius of the user location;

determine if each of the plurality of points-of-interest having a location within the circle sector and radius of the user location are visible to the user from the user location; and discard any points-of-interest determined to not be visible to the user.

15. The computer program product of claim 14, further comprising program code instructions to rank the plurality of points-of-interest not discarded using program code instructions to, for each non-discarded point-of-interest:

determine a distance from the user location;

determine a position of the point-of-interest within the field of view, wherein the position comprises an angle relative to a center of the field of view;

calculate a score for the point-of-interest based, at least in part, on the distance and the position; and rank each of the plurality of points-of-interest according to their respective scores.

16. The computer program product of claim 10, wherein the program code instructions to determine a point-of-interest associated with the query by conducting a search of a database using the generated query comprises program code instructions to:

determine at least two points-of-interest associated with the query;

determine at least one distinguishing feature that disambiguates the at least two points-of-interest;

generate a natural language question based on the at least one distinguishing feature; and determine one of the at least two points-of-interest in response to a received reply to the natural language question.

17. The computer program product of claim 16, wherein the at least one distinguishing feature comprises one or more of: point-of-interest type, building feature, building construction, building material, position relative to a distinct location, building color, building size, business name, or business type.

18. The computer program product of claim 10, wherein the program code instructions to determine a point-of-interest associated with the query comprises program code instructions to filter a plurality of points-of-interest according to a ranking of the points-of-interest based on a determined relevance to the query, wherein relevance is established based on a location relative to the user, a position within the field of view of the user, and a relevance of the point-of-interest to the at least one request for each respective point-of-interest.

19. A mapping system comprising:

a memory configured to store map data and point-of-interest information associated with a plurality of points-of-interest; and processing circuitry configured to:

receive an indication of a user location;

receive an indication of a field of view of the user at the location, wherein the field of view of the user is established, at least in part, by a gaze tracking sensor;

receive a natural language utterance;

generate, from the natural language utterance, a query, wherein the query includes at least one request determined from the natural language utterance, the location, and the field of view of the user;

determine a point-of-interest associated with the query by conducting a search of the memory using the generated query; and provide information associated with the point-of-interest via a user interface.

20. The mapping system of claim 19, wherein the processing circuitry configured to determine a point-of-interest associated with the query comprises processing circuitry configured to filter a plurality of points-of-interest according to a ranking of the points-of-interest based on a determined relevance to the query, wherein relevance is established based on a location relative to the user, a position within the field of view of the user, and a relevance of the point-of-interest to the at least one request for each respective point-of-interest.

\* \* \* \* \*